US010718396B2

(12) United States Patent
King

(10) Patent No.: US 10,718,396 B2
(45) Date of Patent: Jul. 21, 2020

(54) TUNABLE SUSPENSION LIMITERS FOR SUSPENSION ARRANGEMENTS

(71) Applicant: Goodrich Corporation, Charlotte, NC (US)

(72) Inventor: Michael King, Sauquoit, NY (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 15/881,374

(22) Filed: Jan. 26, 2018

(65) Prior Publication Data

US 2019/0234477 A1    Aug. 1, 2019

(51) Int. Cl.
| | | |
|---|---|---|
| *F16F 9/58* | (2006.01) | |
| *F16F 3/10* | (2006.01) | |
| *B60G 11/36* | (2006.01) | |
| *F16F 1/02* | (2006.01) | |
| *B60G 7/04* | (2006.01) | |
| *B60G 11/42* | (2006.01) | |
| *B60G 11/52* | (2006.01) | |

(52) U.S. Cl.
CPC ............... *F16F 3/10* (2013.01); *B60G 7/04* (2013.01); *B60G 11/36* (2013.01); *B60G 11/42* (2013.01); *B60G 11/52* (2013.01); *F16F 1/027* (2013.01); *B60G 2200/30* (2013.01); *B60G 2202/112* (2013.01); *B60G 2202/12* (2013.01); *B60G 2204/45* (2013.01); *B60G 2204/4502* (2013.01); *B60G 2206/42* (2013.01); *B60G 2206/72* (2013.01); *B60G 2800/162* (2013.01); *F16F 2228/14* (2013.01)

(58) Field of Classification Search
CPC ...... F16F 3/10; F16F 1/027; F16F 9/58; F16F 9/585; B60G 7/04; B60G 11/36; B60G 11/42; B60G 11/52; B60G 11/22; B60G 2202/143

See application file for complete search history.

(56) References Cited

U.S. PATENT DOCUMENTS

| | | | |
|---|---|---|---|
| 4,997,171 | A | 3/1991 | Toms, Jr. |
| 5,158,504 | A | 10/1992 | Stocco |

(Continued)

FOREIGN PATENT DOCUMENTS

| | | |
|---|---|---|
| BE | 346344 A | 12/1927 |
| EP | 3098472 A1 | 11/2016 |

(Continued)

OTHER PUBLICATIONS

Extended European Search Report dated Jun. 25, 2019, issued during the prosecution of European Patent Application No. EP 19153312.4.

*Primary Examiner* — Thomas W Irvin

(74) *Attorney, Agent, or Firm* — Locke Lord LLP; Scott D. Wofsy; Joshua L. Jones

(57) ABSTRACT

A suspension limiter includes a diaphragm element configured to be placed in operable communication with a suspension such that a rate of increase in load per unit travel of compression of the suspension is reduced near a full travel of the suspension than would exist for the suspension if the diaphragm element were not present, the diaphragm element arranged to deform only elastically through the full travel of the suspension. Suspension arrangements and methods of loading suspension arrangements are also described.

16 Claims, 10 Drawing Sheets

(56) References Cited

U.S. PATENT DOCUMENTS

| | | | |
|---|---|---|---|
| 5,992,863 A | 11/1999 | Forbes-Robinson et al. | |
| 6,039,388 A * | 3/2000 | Choi | E05F 5/022 |
| | | | 296/207 |
| 6,408,970 B1 | 6/2002 | Eng | |
| 7,958,979 B2 | 6/2011 | Sekiya et al. | |
| 9,764,612 B2 * | 9/2017 | Al-Dahhan | F16F 1/377 |
| 9,975,388 B2 * | 5/2018 | Brown | B60G 11/22 |
| 10,274,036 B2 * | 4/2019 | Al-Dahhan | F16F 1/37 |
| 2006/0043659 A1 | 3/2006 | Gofron et al. | |
| 2010/0127437 A1 * | 5/2010 | Stevens | F16F 9/38 |
| | | | 267/64.11 |
| 2010/0230877 A1 * | 9/2010 | Schudt | F16F 1/377 |
| | | | 267/220 |
| 2010/0327548 A1 | 12/2010 | Falkner et al. | |
| 2016/0185173 A1 * | 6/2016 | Brown | B60G 11/22 |
| | | | 267/292 |
| 2017/0144504 A1 * | 5/2017 | Al-Dahhan | F16F 1/37 |

FOREIGN PATENT DOCUMENTS

| | | |
|---|---|---|
| FR | 14722 | 2/1912 |
| WO | 2014/055599 A1 | 4/2014 |

\* cited by examiner

TUNABLE SUSPENSION LIMITERS FOR SUSPENSION ARRANGEMENTS

BACKGROUND OF THE INVENTION

1. Field of the Invention

The present disclosure relates to suspension arrangements, and more particularly to suspension limiters for suspension arrangements in vehicles.

2. Description of Related Art

Suspension systems, such as automobile suspensions, commonly employ structures like struts and shock absorbers to limit the magnitude of shock and impact forces exerted on the vehicle chassis. Struts and shock absorbers generally deform according to the magnitude of shock and impact forces exerted on the vehicle chassis until a limit of travel is reached, at which point a stop structure prevents further deformation of strut and/or shock absorber. Since bottoming out against the stop structure can cause discomfort to vehicle passengers, present control problems, and/or damage to the vehicle, some vehicles employ jounce bumpers.

A jounce bumper (also called a bump stop, rebound bumper, end-of-travel bumper, strike-out bumper, suspension bumper, or compression bumper) is a shock-absorbing device, ordinarily positioned near an end of the vehicle suspension, for cushioning the impact between two suspension system components, such as the axle and a portion of the frame, as well as for attenuating noise and vibration to increase the ride comfort of the passengers. During jounce motions the strut or shock absorber contacts with the jounce bumper plate and compresses the jounce bumper. This dissipates impact energy by cushioning the impact, reducing noise, and limits passenger discomfort, control, and/or damage from the impact.

Such conventional methods and systems have generally been considered satisfactory for their intended purpose. However, there is still a need in the art for improved suspension limiters for vehicular suspension arrangements. The present disclosure provides a solution for this need.

SUMMARY OF THE INVENTION

A suspension limiter includes a diaphragm element configured to be placed in operable communication with a suspension such that a rate of increase in load per unit travel of compression of the suspension is reduced near a full travel of the suspension than would exist for the suspension if the diaphragm element were not present, the diaphragm element arranged to deform only elastically through the full travel of the suspension.

In certain embodiments the diaphragm element can include a diaphragm disc arranged along a compression axis. The diaphragm disc can have a radially inner hub portion, a radially outer rim portion, and a diaphragm portion extending between the hub portion and the rim portion. A puck can be fixed relative to the hub portion or the rim portion of the diaphragm disc to oppose compression of a suspension system spring by deforming the diaphragm portion of the diaphragm disc.

In accordance with certain embodiments the puck can be fixed relative to the portion of the diaphragm disc. The puck can be fixed relative to the hub portion of the diaphragm disc. The diaphragm disc can be an end diaphragm disc. A diaphragm disc pair can stacked with the end diaphragm disc and the puck along the compression axis. The diaphragm disc pair can be stacked between the end diaphragm disc and the puck or between the puck and the diaphragm disc pair.

It is contemplated that, in accordance with certain embodiments, the suspension limiter can include a piston. The piston can be connected between the puck and the diaphragm disc. The piston can be arranged along the translation axis between the puck and the diaphragm disc. A fastener can be seated in the piston. The puck can be coupled the piston by the fastener. A spacer can be connected between the puck and the diaphragm disc.

It is also contemplated that, in accordance with certain embodiment, the suspension limiter can include an end cap. The end cap can be stacked along the translation axis on a side of the diaphragm disc opposite the puck. A housing can extend about the diaphragm disc. A mounting bracket can be fixed relative to the housing. The space can be captive in the end cap and axially stacked along the translation axis between the diaphragm disc and the puck.

A suspension arrangement can include a suspension limiter as described above and a spring. The spring can be movable along the compression axis between a loaded position and an unloaded position. In the unloaded position the spring is spaced apart from the puck. In the loaded position the spring abuts the puck.

In certain embodiments the diaphragm disc is a first end diaphragm disc and the suspension limiter includes a second end diaphragm disc. The second end diaphragm disc is stacked on a side of the first diaphragm disc opposite the puck. One or more diaphragm disc pairs is stacked along the compression axis between the first end diaphragm disc and the second end diaphragm disc. The spring can include a coil body or a leaf assembly.

In accordance with certain embodiments the suspension arrangement can include a piston, a fastener, a spacer, a housing, and an end cap. The piston is connected between the puck and the diaphragm disc and stacked between along the translation axis between the puck and the diaphragm disc. The fastener is seated in the piston and couples the puck to the piston. The spacer is connected between the puck and the diaphragm disc. The housing has a mounting bracket, is fixed to the end cap, and extends about the diaphragm disc. The end cap is stacked along the translation axis on a side of the diaphragm disc opposite the puck with the spacer captive in the end cap along the translation axis between the diaphragm disc and the puck.

A method of loading a suspension arrangement includes exerting a compression force against a suspension limiter and deforming the suspension limiter. The suspension limiter is deformed elastically such that a rate of increase in load per unit travel of compression of the suspension is reduced near a full travel of the suspension than would exist for the suspension if the diaphragm element were not present, wherein the diaphragm element is configured to deform only elastically through the full travel of the suspension. In certain embodiments the method can include tuning deformation of the suspension limiter by adding one or more diaphragm discs to the suspension limiter and/or increasing axial thickness of a spacer seated within the suspension limiter.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
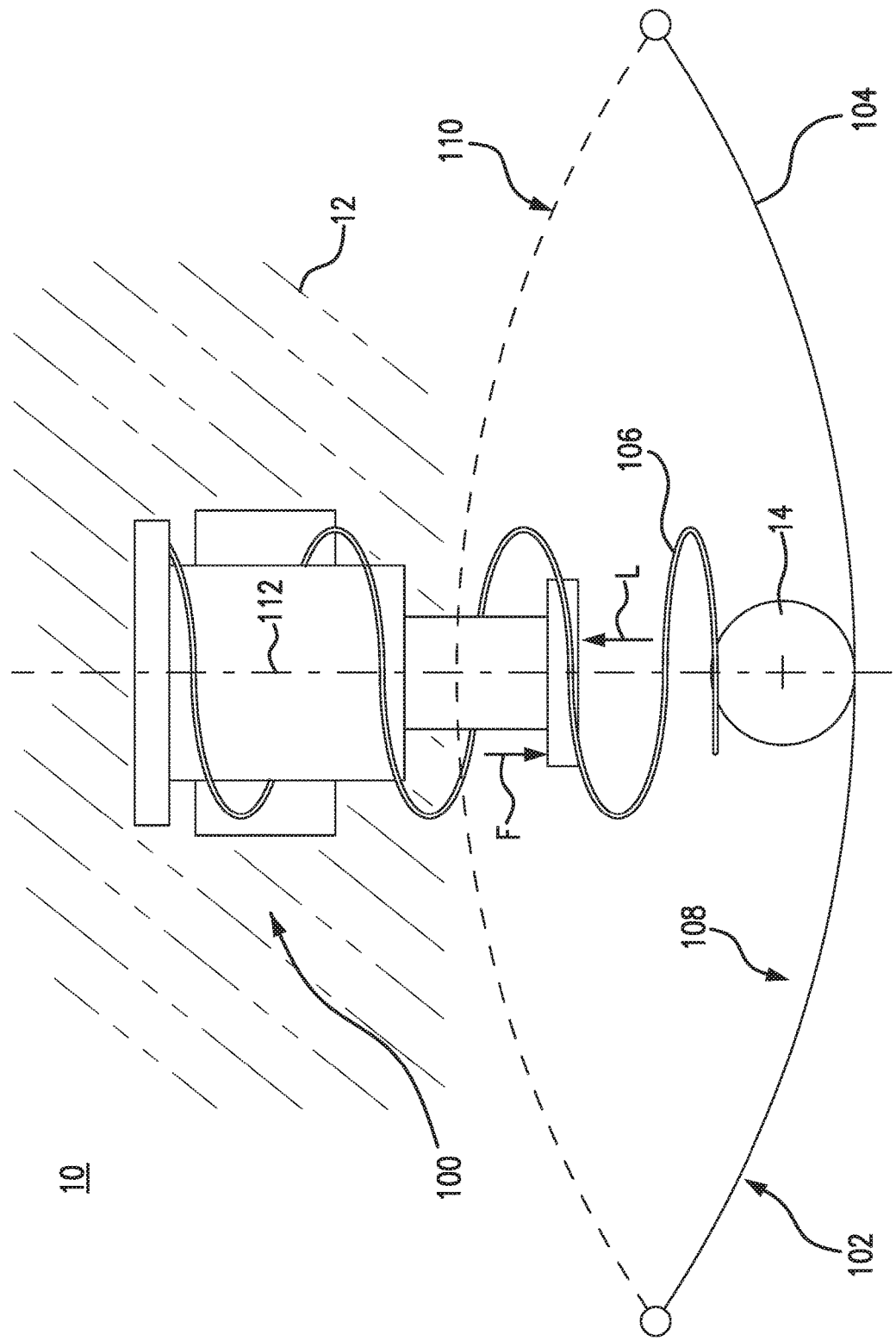
FIG. 1 is a schematic view of a suspension arrangement for a vehicle constructed in accordance with the present disclosure, showing spring arrangement with a suspension limiter.

Reference will now be made to the drawings wherein like reference numerals identify similar structural features or aspects of the subject disclosure. For purposes of explanation and illustration, and not limitation, a partial view of an exemplary embodiment of a suspension limiter in accordance with the disclosure is shown in FIG. 1 and is designated generally by reference character 100. Other embodiments of suspension limiters, suspension arrangements with suspension limiters, and methods controlling jounce in suspension arrangements in accordance with the disclosure, or aspects thereof, are provided in FIGS. 2-12 as will be described. The systems and methods described herein can be used in suspension arrangements for vehicles, such as in automobiles, though the present disclosure is not limited to automobiles or to ground vehicles in general.

Referring to FIG. 1, a vehicle 10 is shown. Vehicle 10 includes a chassis 12, an axle 14, and a suspension arrangement 102. Suspension arrangement 102 includes is connected between axle 14 and chassis 12, includes suspension limiter 100 and one or more of a leaf spring 104 and coil spring 106. Leaf spring 104 has an unloaded position 108 (shown in solid line) and a fully loaded position 110 (shown in dashed line) that are arranged along a compression axis 112. In the unloaded position 108 leaf spring 104 spaces axle 14 apart from suspension limiter 100. In the fully loaded position 110 leaf spring 104 deforms responsive a compressive forces, e.g., load L, such that axle 14 abuts suspension limiter 100. Suspension limiter 100 is arranged to compressively deform to resist travel of leaf spring 104 as leaf spring 104 approaches fully loaded position 110, e.g., by exerting a reaction force F in a direction opposite to load L, thereby limiting jounce of chassis 12 responsive to movement of axle 14.

Figure 2:
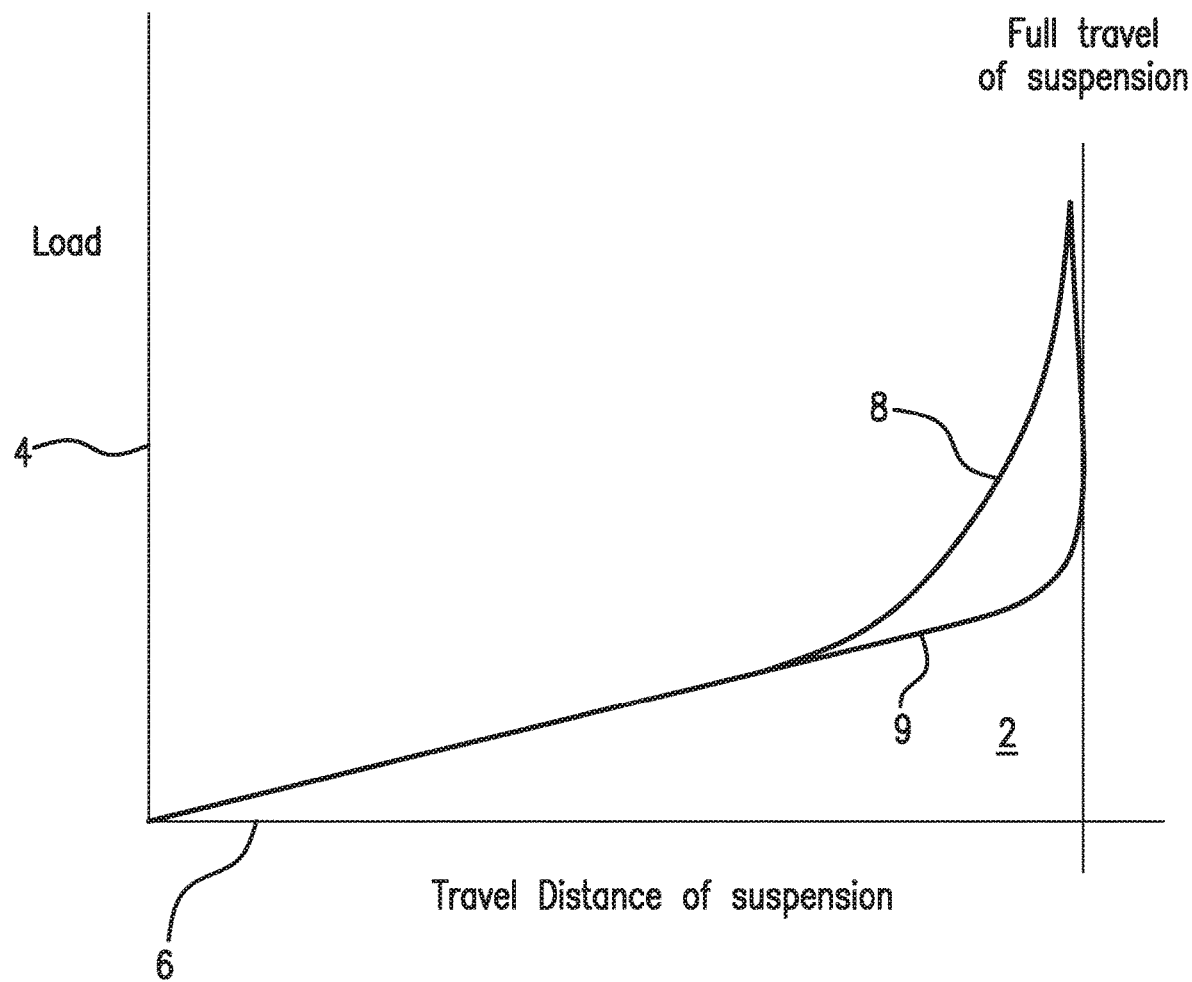
FIG. 2 is a graph of travel distance versus load for the suspension arrangement of FIG. 1 and suspension arrangement without a suspension limiter, showing the suspension limiter limiting travel at higher loads.

With reference to FIG. 2, a graph 2 of travel distance of suspension 6 versus load 4 is shown. Graph 2 has a trace 8 showing travel of suspension arrangement 102 (shown in FIG. 1) having a diaphragm element 116 (shown in FIG. 3) and a trace 9 showing travel of suspension arrangement 102 without diaphragm element 116. In embodiments described herein suspension limiter 100 includes diaphragm element 116. Diaphragm element 116 is configured to be placed in operable communication with a suspension, e.g., leaf spring 104 (shown in FIG. 1) or coil spring 106 (shown in FIG. 1), such that a rate of increase in load, e.g. load L (shown in FIG. 1) per unit travel of compression of the suspension is reduced near a full travel of the suspension than would exist for the suspension if diaphragm element 116 were not present, diaphragm element 116 configured to deform only elastically through the full travel of the suspension.

Figure 3:
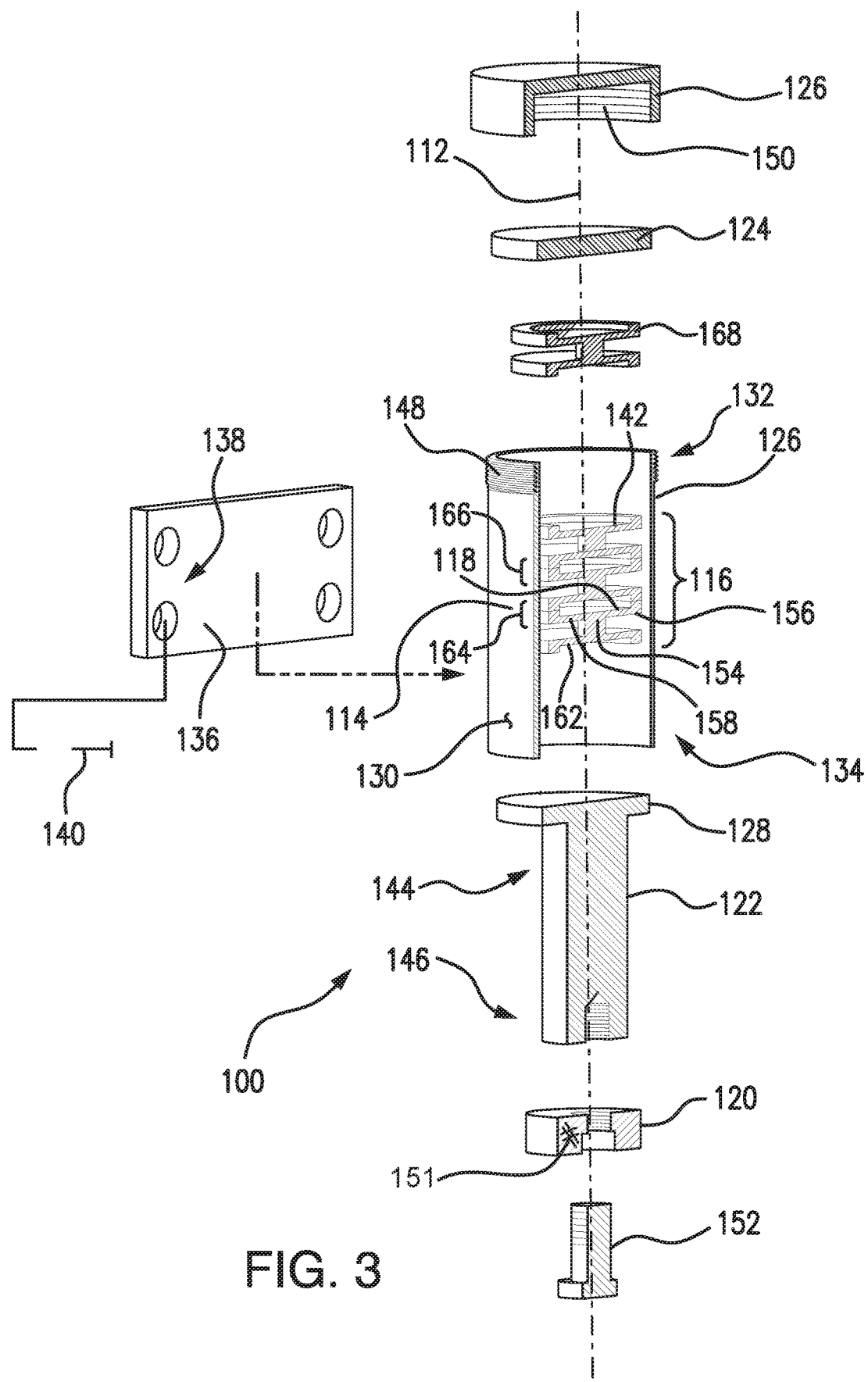
FIG. 3 is an exploded view of an exemplary embodiment of the suspension limiter of FIG. 1, showing a diaphragm element of the suspension limiter including axially stacked diaphragm discs and diaphragm disc pairs.

With reference to FIG. 3, suspension limiter 100 is shown. Suspension limiter 100 includes a housing 114, a diaphragm element 116 with a diaphragm disc 118, and a puck 120. Housing 114, diaphragm disc 118 and puck 120 are each arranged along compression axis 112. Suspension limiter 100 also includes a piston 122 a first spacer 124, a second spacer 128, and an end cap 126. Piston 122, first spacer 124, second spacer 128 and end cap 126 are also arranged along compression axis 112. It is contemplated that one or more of the suspension limiter components, e.g., diaphragm disc 118, are formed from a steel or titanium material. In certain embodiments one or more of the suspension limiter components includes a corrosion protection material, such as anodization or a lacquer layer, to protect the material forming the respective suspension limiter component.

Housing 114 has a cylinder body 130. Cylinder body 130 extends about compression axis 112 and has a cap end 132 and a piston end 134. Piston end 134 is configured to receive piston 122. Cap end 132 is disposed on an end of cylinder body 130 axially opposite piston end 134 and has male threads 148. Male threads 148 extend about a radially outer surface of cap end 132 for fixing end cap 126 on cylinder body 130.

End cap 126 has female threads 150. Female threads 150 are defined on a radially inner surface of end cap 126, extend circumferentially about compression axis 112, and are arranged to threadably engage end cap 126 to cap end 132 of cylinder body 130. Threaded engagement of end cap 126 to cylinder body 130 allows for tuning the response of suspension limiter 100 to jounce impacts by adding or removing diaphragm discs, e.g., a second diaphragm disc 142, from the interior of cylinder body 130.

A mounting bracket 136 is fixed to cylinder body 130. Mounting bracket 136 is configured and adapted for coupling cylinder body 130 of suspension limiter 100 to vehicle 10 (shown in FIG. 1). In the illustrated exemplary embodiment mounting bracket 136 defines a fastener pattern 138 arranged to receive one or more fasteners 140, e.g., bolts, to fix mounting bracket 136 to chassis 12 (shown in FIG. 1). Although shown in FIG. 3 as employing the one or more fastener 140 and fastener pattern 138, those of skill in the art will readily appreciate that other types fixation may also be employed to fix suspension limiter 100 to vehicle 10. As will also be appreciated by those of skill in the art, suspension limiter 100 can also be fixed to other locations on vehicle 10, e.g., to axle 14 (shown in FIG. 1) or leaf spring 104, and remain within the scope of the present invention.

Piston 122 extends along compression axis 112 and has a diaphragm end 144 and an axially opposite puck end 146. Second spacer 128 is connected to diaphragm end 144 of piston 122 and is moveable axially along compression axis 112 relative to first spacer 124. Second spacer 128 is sized such that second spacer 128 can be slidably received with cylinder body 130 to retain diaphragm disc 118 therein without binding. As shown in FIG. 3 second spacer 128 is integrally formed on an end of piston 122, such as by turning down of piece stock from a suitable stock diameter. In certain embodiments second spacer 128 is a separate element connected to piston 122, such as by fastening or welded, as suitable for an intended application.

Puck 120 is connected to puck end 146 of piston 122. In the illustrated exemplary embodiment puck 120 is coupled to puck end 146 of piston 122 by fastener 152, which is threadably seated in puck end 146 to fix puck 120 piston 122. It is contemplated that puck 120 includes non-metallic material 151 suitable for resisting jounce impacts. Examples of suitable non-metallic materials include rubber and thermoplastic materials.

Diaphragm element 116 arranged within the interior of cylinder body 130 between first spacer 124 and second spacer 128. Diaphragm element 116 includes one or more diaphragm disc 118 having a radially inner hub 154, a radially outer rim 156, and a diaphragm portion 158 extending radially between radially inner hub 154 and radially outer rim 156. Examples of suitable diaphragm elements and diaphragm discs include those described in U.S. Pat. No. 5,158,504 to Stocco, issued on Oct. 27, 1992, the contents of which are incorporated herein by reference in its entirety. Advantageously, diaphragm discs such as diaphragm disc 118 can generate response forces that do not change due to high cyclic fatigue loading or from environmental exposure. Diaphragm discs such as diaphragm disc 118 can also eliminate the need to use pressurized gas or fluids like oil, which can leak, and resilient material, which can degrade over time due to dry rot.

In exemplary embodiment illustrated in FIG. 3 diaphragm element 116 includes a first diaphragm disc pair 164 and a second diaphragm disc pair 166 arranged between a first end diaphragm disc 142 and a second end diaphragm disc 162. Second diaphragm disc pair 166 is axially stacked with first diaphragm disc pair 164 with first end diaphragm disc 142 and second end diaphragm disc 162, are additionally arranged between first spacer 124 and second end spacer 128. This is for illustration purposes only and is non-limiting. As will be appreciated by those of skill in the art in view of the present disclosure, suspension limiter 100 can have fewer diaphragm discs (or disc pairs) or more diaphragm discs (or disc pairs) than illustrated in FIG. 3, as suitable for an intended application.

Figure 4:
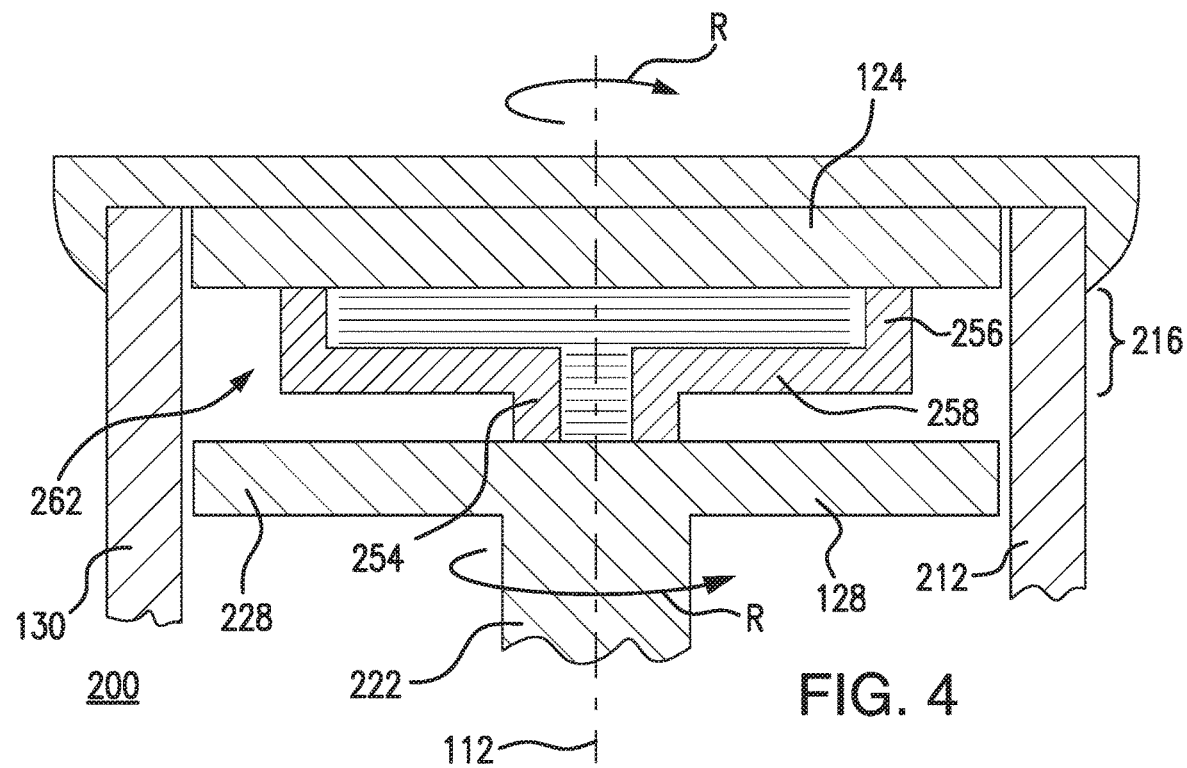
FIGS. 4 and 5 are cross-sectional views of the suspension arrangement of FIG. 1 according to a first embodiment, showing a diaphragm disc element with a single diaphragm disc.

In certain embodiments diaphragm element 116 is rotationally free relative to either (or both) first spacer 124 and second spacer 128 (shown in FIG. 4 with rotation arrows R). Rotational freedom allows for tuning response of suspension limiter 100 for a given load. For example, a diaphragm element having a different number of diaphragm discs can be substituted for diaphragm element 116 to change the response of suspension limiter 100 for a given load L. Alternatively, either (or both) first spacer 124 and second spacer 128 can be replaced with a spacer(s) having a different axial height to change the response of suspension limiter for a given load L. It is contemplated that the tuning can be done in situ, i.e., while the suspension limiter is fixed to a vehicle, by unscrewing end cap 126 and changing the arrangement of diaphragm elements and/or spacer(s) within cylinder body 130.

Figure 5:
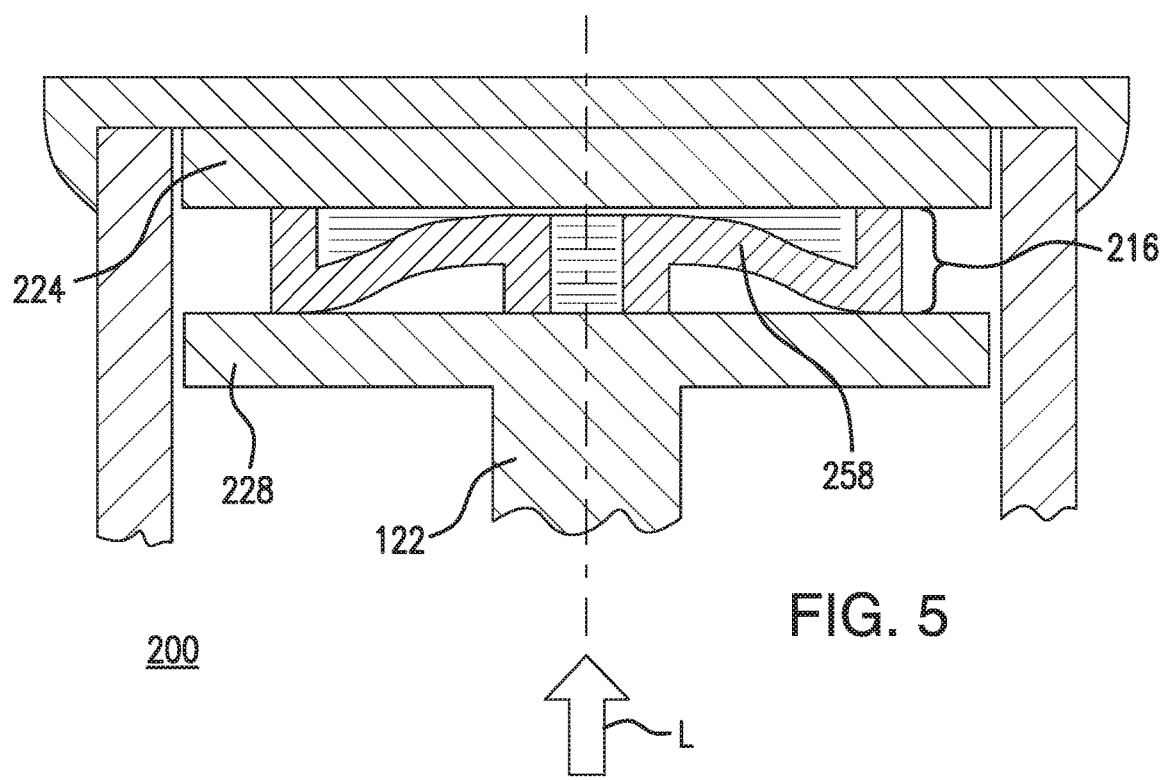

Referring to FIGS. 4 and 5, a suspension limiter 200 is shown. Suspension limiter 200 is similar to suspension limiter 100 and additionally includes a diaphragm element 216. Diaphragm element 216 includes a single diaphragm disc 262. Single diaphragm disc 262 has a radially inner hub portion 254, a radially outer rim portion 256, and diaphragm portion 258 extending between radially inner hub portion 254 and radially outer rim portion 256. In the illustrated exemplary embodiment single diaphragm disc 262 is axially stacked within a cylinder body 130 directly between a first spacer 124 and a second spacer 128. More particularly, single diaphragm disc 262 is arranged within cylinder body 130 such that radially inner hub portion 254 abuts second spacer 128 and radially outer rim portion 256 abuts first spacer 124 on an axially opposite end of piston 122.

As shown in FIG. 5, diaphragm portion 258 of diaphragm element 216 deforms upon application of force L (shown in FIG. 1) to diaphragm element 216 through piston 122. More particularly, single diaphragm disc 262 deforms by flexure of diaphragm portion 258 in response to force L, e.g., via force applied thereto via axle 14 (shown in FIG. 1) and/or leaf spring 104 (shown in FIG. 1), between first spacer 124 and piston 122.

Figure 6:
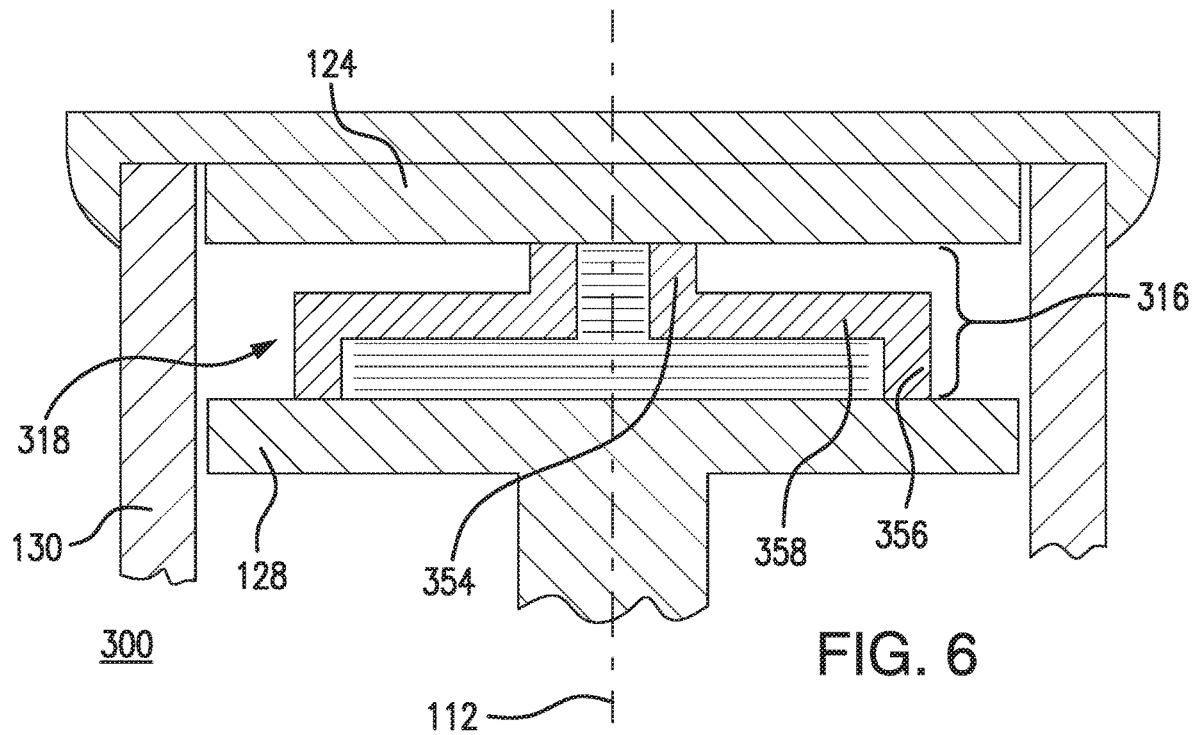
FIGS. 6 and 7 are cross-sectional views of the suspension arrangement of FIG. 1 according to a second embodiment, showing a single diaphragm disc inverted relative to FIGS. 4 and 5.
Figure 7:
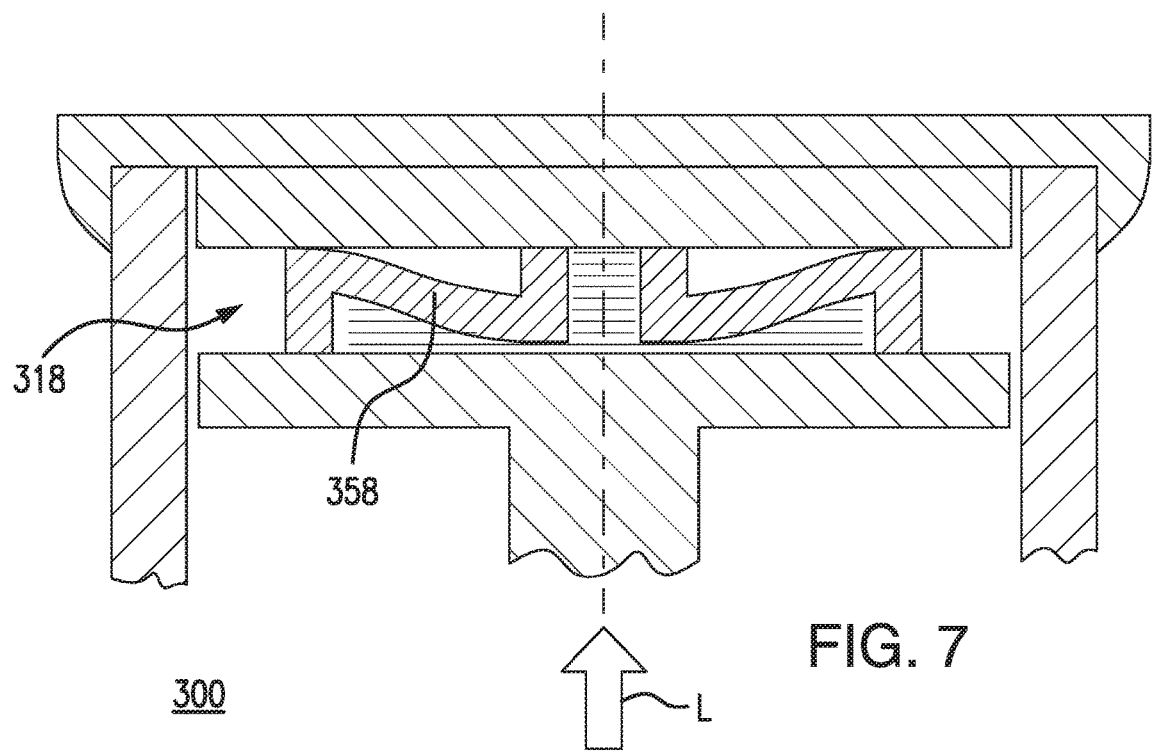

Referring to FIGS. 6 and 7, a suspension limiter 300 is shown. Suspension limiter 300 is similar to suspension limiter 100 (shown in FIG. 1) and additionally includes a diaphragm element 316 with a single diaphragm disc 318. Single diaphragm disc 318 has a radially inner hub portion 354, a radially outer rim portion 356, and diaphragm portion 358 extending between radially inner hub portion 354 and radially outer rim portion 356. Radially inner hub portion 354 abuts a first spacer 124 and radially outer rim portion 356 abuts a second spacer 128 on an axially opposite end of diaphragm element 316. As shown in FIG. 7, single diaphragm disc 318 deforms (via flexure of diaphragm portion 358) in response to force L communicated through piston 122. Advantageously, arrangement of radially outer rim portion 356 in abutment with second spacer 128 can maintain centering of diaphragm element 316 within cylinder body 130.

Figure 8:
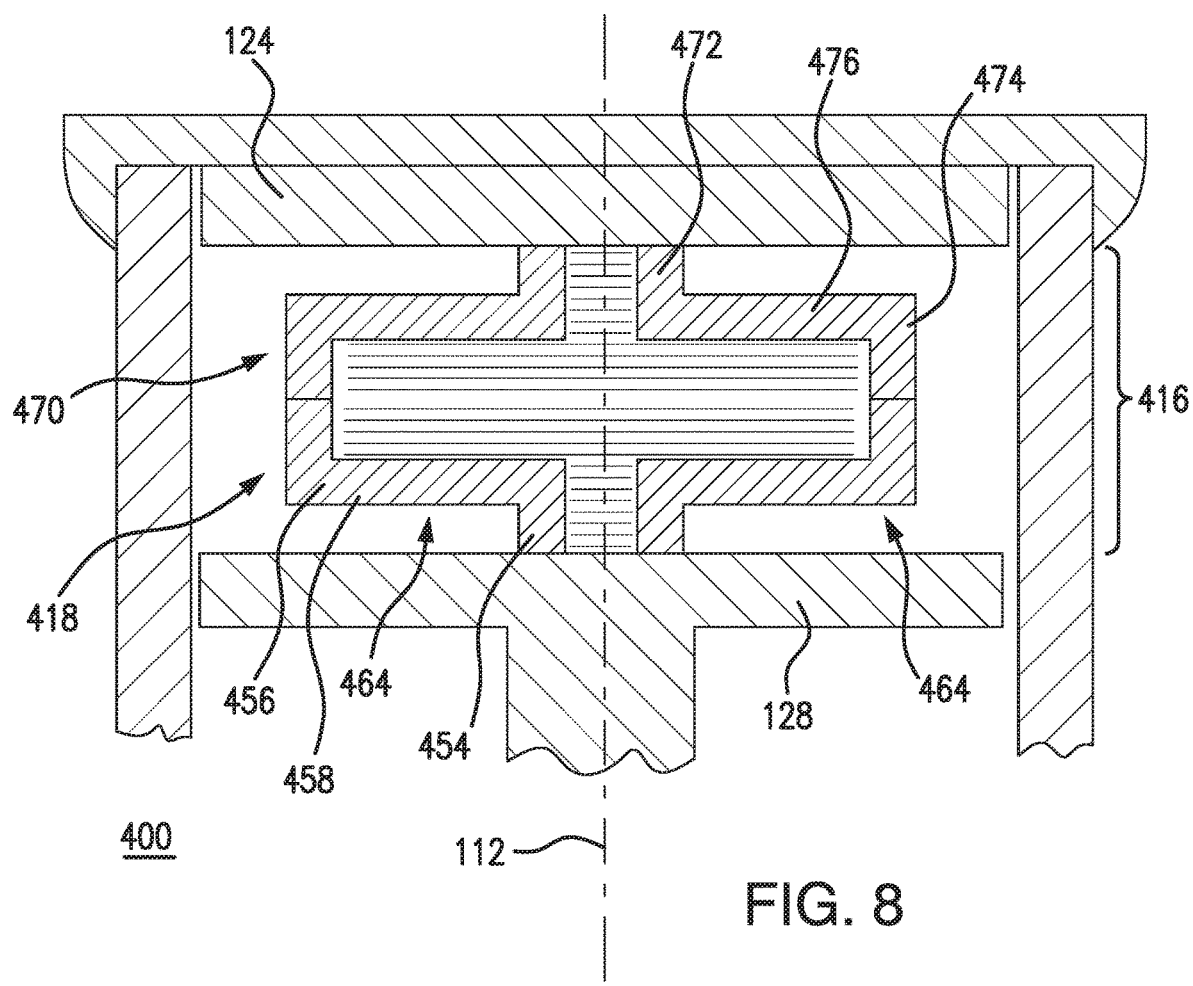
FIGS. 8 and 9 are cross-sectional views of the suspension arrangement of FIG. 1 according to a fourth embodiment, showing a diaphragm element with a diaphragm disc pair.
Figure 9:
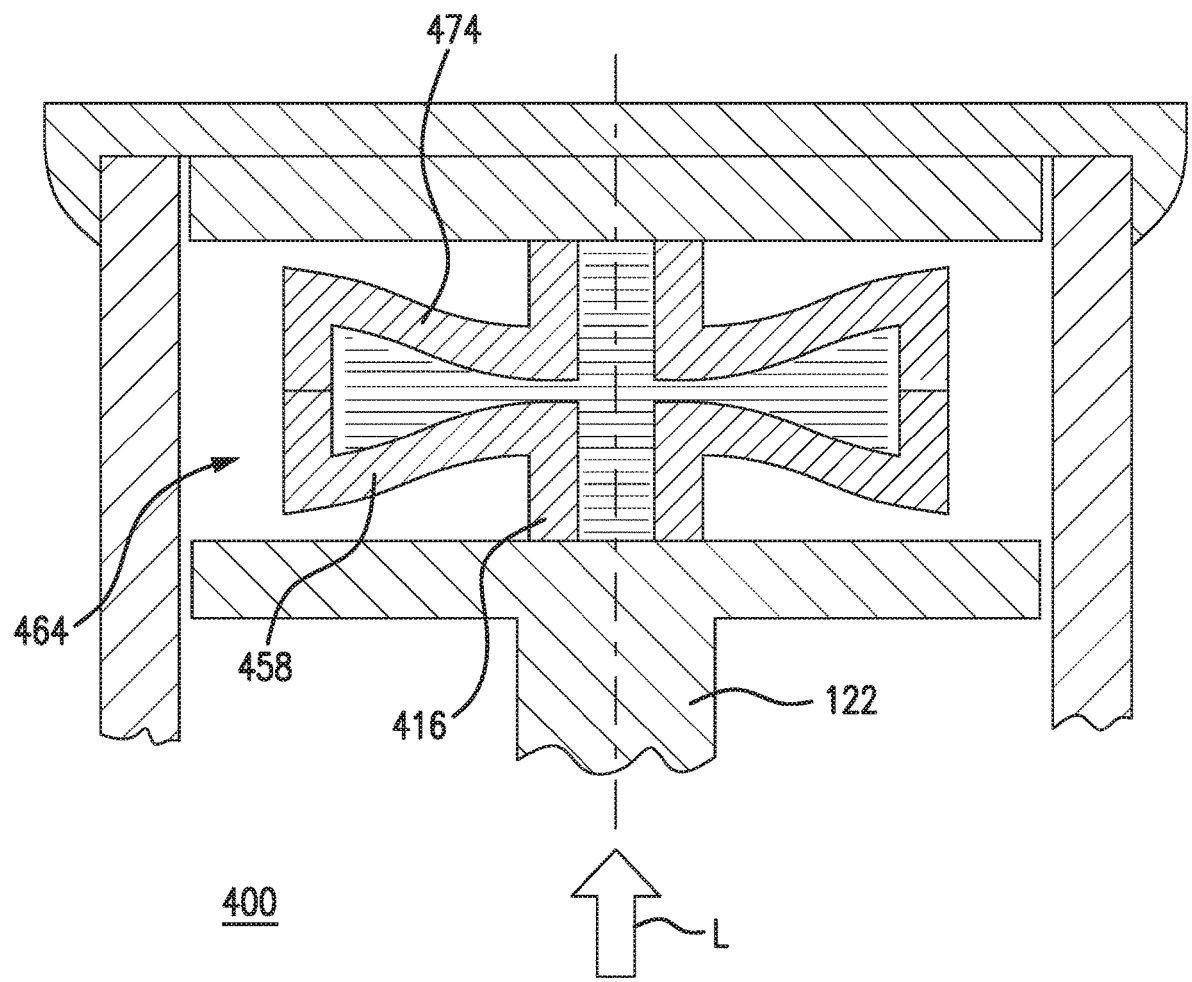

Referring to FIGS. 8 and 9, a suspension limiter 400 is shown. Suspension limiter 400 is similar to suspension limiter 100 (shown in FIG. 1) and additionally includes a diaphragm element 416 having single diaphragm disc pair 464. Single diaphragm disc pair 464 has a diaphragm a first diaphragm disc 418 and a second diaphragm disc 470 axially stacked along compression axis 112 and rotatably free relative to first spacer 124 and second spacer 128. First diaphragm disc 418 has a radially inner hub 454, a radially outer rim 456, and a diaphragm portion 458 extending between radially inner hub 454 and radially outer rim 456.

Second diaphragm disc 470 is similar to first diaphragm disc 418 and has a radially inner hub 472, a radially outer rim 474 and a diaphragm portion 476. Diaphragm portion 476 extends between radially inner hub 472 and radially outer rim 474. Radially outer rim 474 of second diaphragm disc 470 is connected to radially outer rim 456 of first diaphragm disc 418, such as by a weld or fastener. In the illustrated exemplary embodiment suspension limiter 400 includes only two diaphragm discs, radially inner hub 472 of second diaphragm disc 470 abutting second spacer 128 along compression axis 112 and radially inner hub 454 of first diaphragm disc 418 abutting second spacer 128.

As shown in FIG. 9, single diaphragm disc pair 464 deforms via flexure of diaphragm portion 458 of first diaphragm disc 418 and flexure of diaphragm portion 476 of second diaphragm disc 470 in response to force L, which is communicated through piston 122 to diaphragm element 416. As will be appreciated by those of skill in the art in view of the present disclosure, addition of second diaphragm disc 470 tunes the response of suspension limiter 400 by causing suspension limiter 400 to resist force L earlier in the stroke of piston 122. In certain embodiments second diaphragm disc 470 increases the maximum magnitude of force L that can be opposed prior to force L being communicated to chassis 12 (shown in FIG. 1), i.e. when suspension limiter 400 bottoms out against chassis 12.

Figure 10:
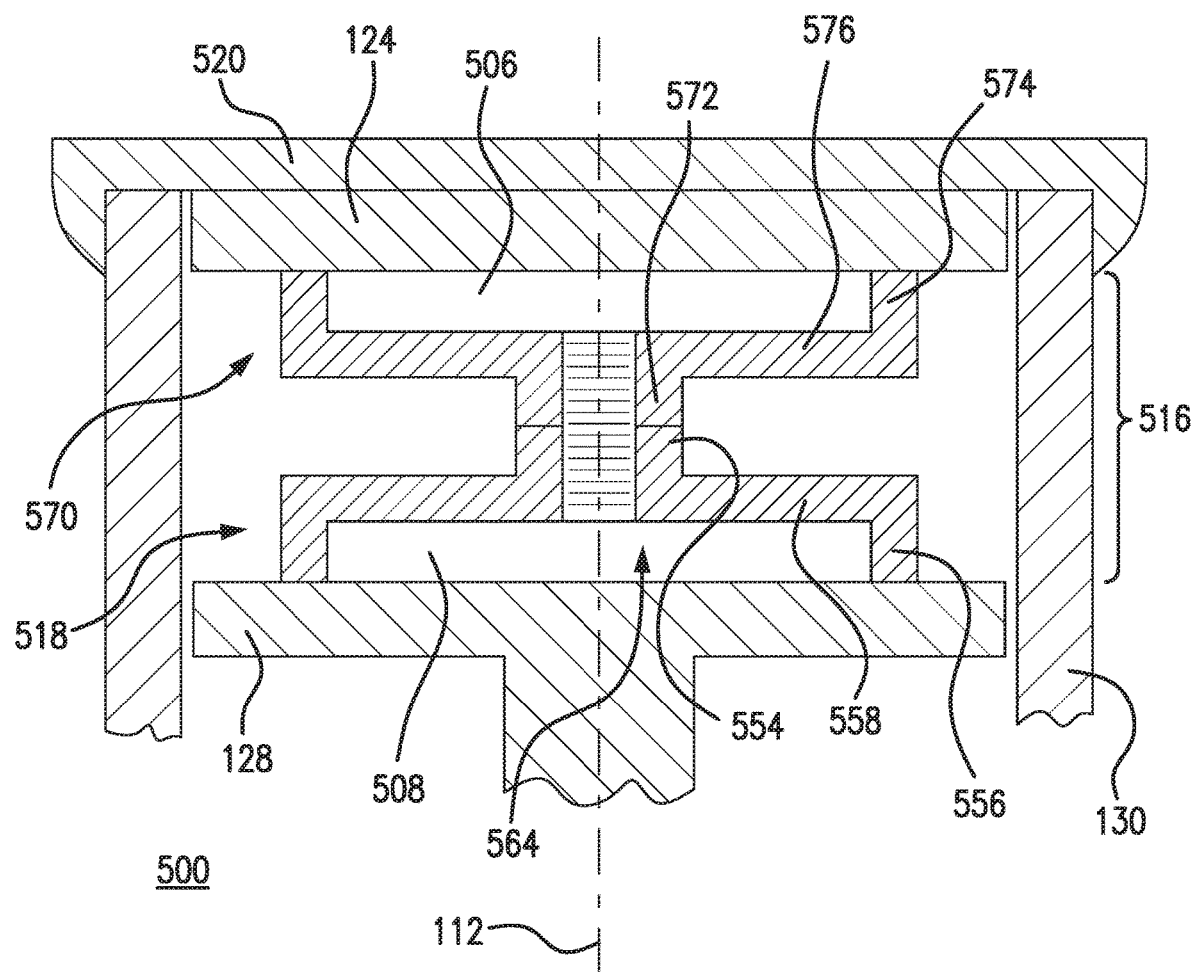
FIGS. 10 and 11 are cross-sectional views of the suspension arrangement of FIG. 1 according to a fifth embodiment, showing discs inverted relative to FIGS. 8 and 9.
Figure 11:
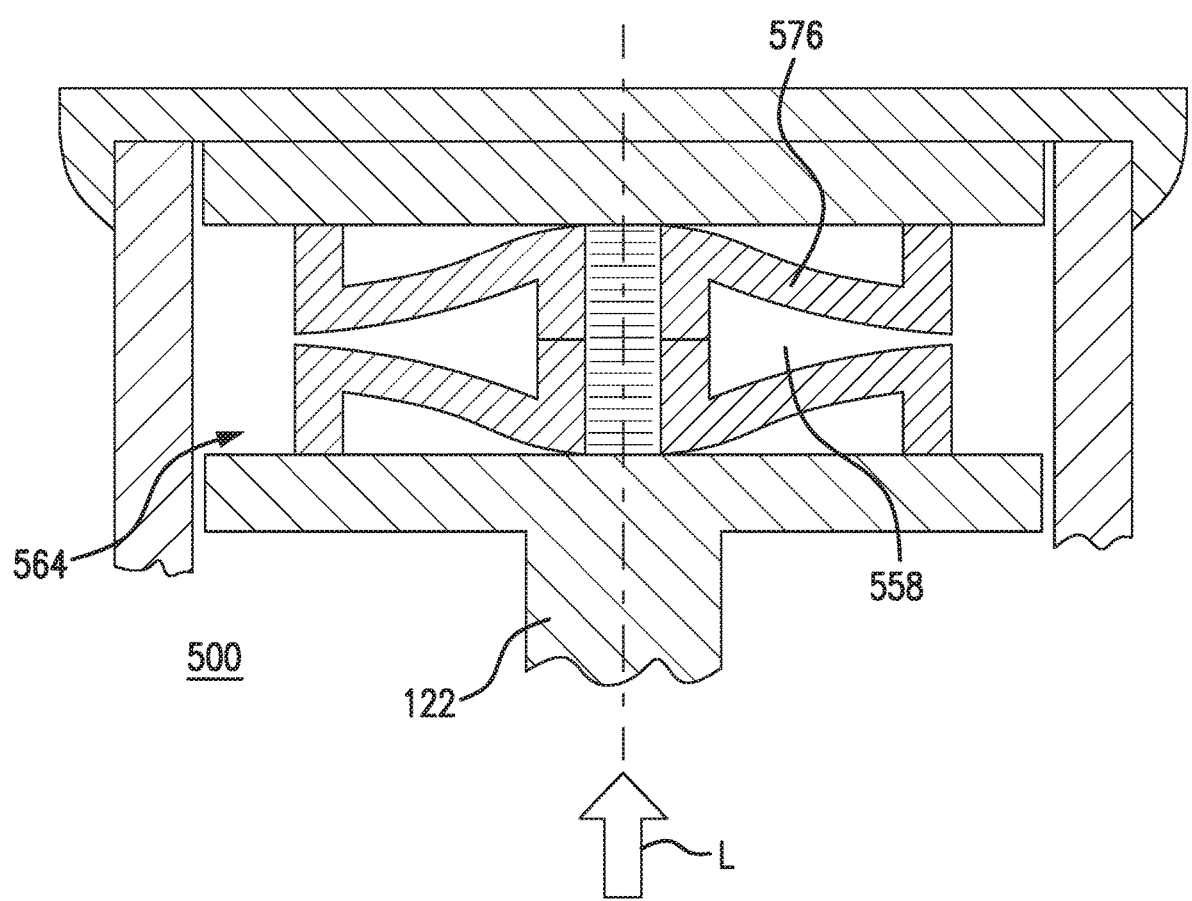

Referring to FIGS. 10 and 11, a suspension limiter 500 is shown. Suspension limiter 500 is similar to suspension limiter 100 (shown in FIG. 1) and additionally includes a diaphragm element 516 having a single diaphragm disc pair 564. Single diaphragm disc pair 564 includes a first diaphragm disc 518 and a second diaphragm disc 570. First diaphragm disc 518 has a radially inner hub 554, a radially outer rim 556, and a diaphragm portion 558. First disc diaphragm portion 558 extends between radially inner hub 554 and radially outer rim 556 of first diaphragm disc 518. Radially outer rim 556 abuts second spacer 128. In certain embodiments radially inner hub 554 is rotationally free relative to second spacer 128.

Second diaphragm disc 570 is similar to first diaphragm disc 518 and includes a radially inner hub 572, a radially outer rim 574, and a diaphragm portion 576. Diaphragm portion 576 extends between radially inner hub 572 and radially outer rim 574. Second disc radially inner hub portion 572 is connected to first disc radially inner hub 554, such as with one or more fastener or a weld. Second disc radially outer rim 574 abuts first spacer 124. In certain embodiments radially outer rim portion 574 is rotationally free relative to first spacer 124. As will be appreciated by those of skill in the art in view of the present disclosure, diaphragm disc pair 564 being rotationally free relative first spacer 124 and/or second spacer allows suspension limiter 500 to be tuned by adding additional diaphragm disc (or disc pairs) to the interior of cylinder body 130.

As shown in FIG. 11, diaphragm disc pair 564 deforms (via flexure of first disc diaphragm portion 558 and second disc diaphragm portion 576) in response to force L communicated through piston 122 to oppose force L. Advantageously, abutting radially outer rim portions of the diaphragm discs against the spacers reduces teeter of diaphragm element 516 within cylinder body 130 as well as increasing the magnitude of force L that can be resisted by suspension limiter 500 prior to suspension 6 (shown in FIG. 1) reaching the end of suspension travel. As will be appreciated by those of skill in the art in view of the present disclosure, second diaphragm disc 570 also tunes suspension limiter 500 by causing suspension limiter 500 to resist force L earlier in the stroke of piston 122. Second diaphragm disc 570 can also increase the magnitude of force L that can be opposed prior to axle 14 (shown in FIG. 1) bottoming against chassis 12 (shown in FIG. 1) on reaching the full travel of suspension 6 (shown in FIG. 1).

Figure 12:
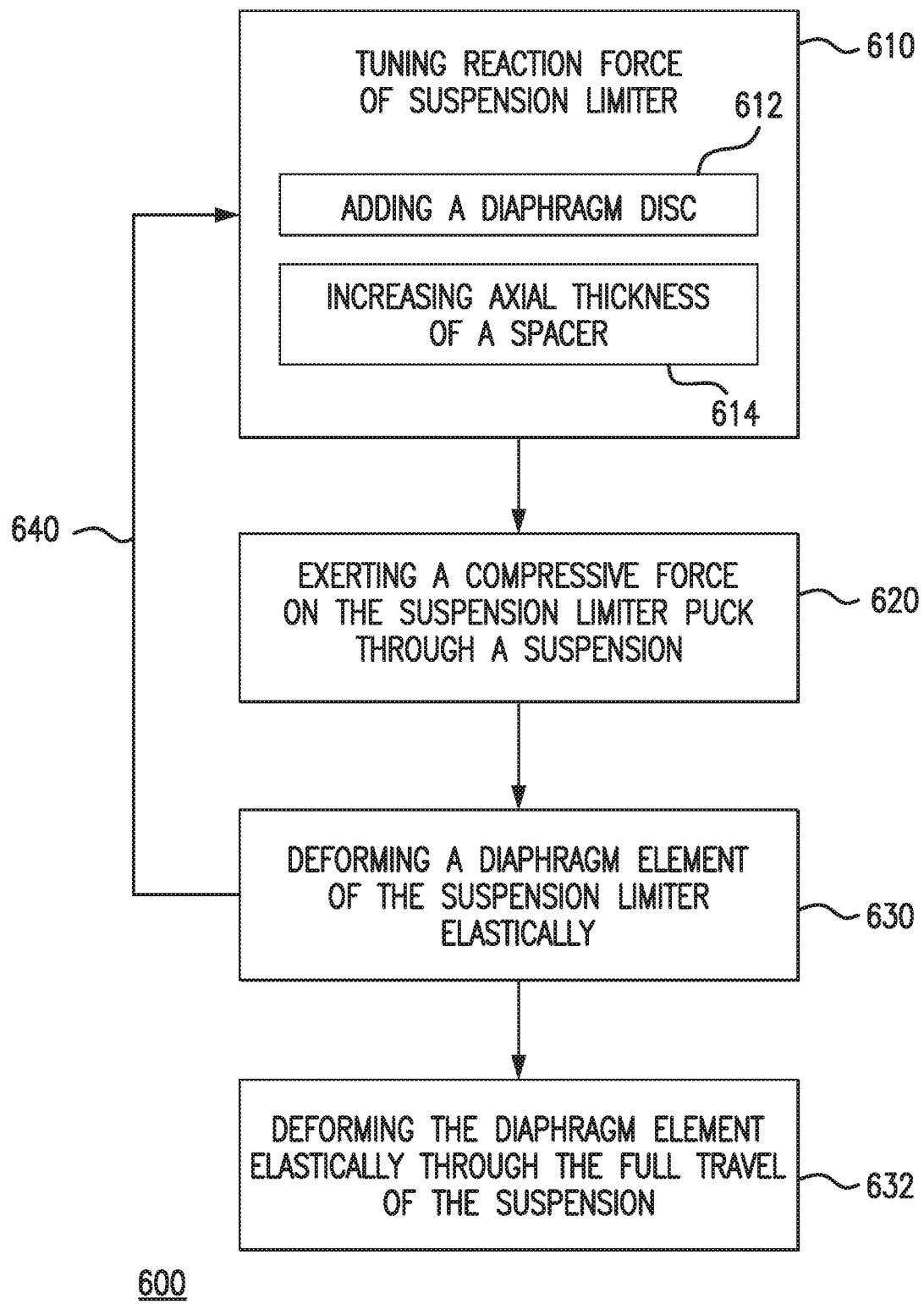
FIG. 12 is a block diagram of a method of limiting travel of a spring in a suspension arrangement with a suspension limiter, showing steps of the method.

Referring to FIG. 12, a method 600 of opposing load in a suspension arrangement, e.g., suspension arrangement 102 (shown in FIG. 1) is shown. Method 600 includes exerting a compressive force, e.g., compressive force L (shown in FIG. 1) against a suspension limiter, e.g., suspension limiter having a diaphragm element, e.g., diaphragm element 116 (shown in FIG. 3) of suspension limiter 100 (shown in FIG. 1), as shown with box 620. The compressive force deforms the suspension limiter elastically such that a rate of increase in load per unit travel of compression of the suspension is reduced near a full travel of the suspension than would exist for the suspension if the diaphragm element were not present, as shown with box 630. It is contemplated that diaphragm element can be deformed only elastically through the full travel of the suspension, as shown with box 632.

In certain embodiments method 600 can include tuning the suspension limiter, as shown with box 610. For example, one or more diaphragm discs, e.g., diaphragm disc 142 (shown in FIG. 3), can be added or removed from the suspension limiter to response of the suspension limiter to force exerted on the suspension limiter, as shown with box 612. Alternatively (or additionally), axial thickness of a spacer, e.g., first spacer 124 (shown in FIG. 3) can be increased (or decreased) to tune response of the suspension limiter to force exerted on the suspension limiter, as shown with box 614. The suspension limiter can be iteratively tuned, e.g., by adding or removing diaphragm elements, as shown with arrow 640.

It is also contemplated that the suspension limiter can be iteratively tuned, as shown with arrow 640, to change response of the suspension limiter to force exerted on the suspension limiter. Such tuning enables the vehicle suspension limiter response to be changed, for example, when the terrain that the vehicle is traversing changes, providing similar ride characteristics notwithstanding changes to forces otherwise outside the response range window the suspension limiter. For example, through the use of stacked diaphragms and spacers, a specific amount of travel of the piston can be selected. The amount of travel would correspond to the specific needs of a vehicle operator and would have an associated spring rate of the suspension limiter. In certain embodiments the spring rate would be linear and constant over at least a portion of the travel of the piston and puck assembly. In accordance with certain embodiments diaphragm discs (and/or diaphragm disc pairs) can be selected with different individual spring rates, the resistance force of the aggregated diaphragm discs in the suspension limiter thereby tuned to a specific nonlinear response for an application.

The methods and systems of the present disclosure, as described above and shown in the drawings, provide for suspension limiters with superior properties including the ability to tune the response of the suspension limiter in-situ as well oppose load of exerted on an suspension toward (or at) the end of travel without reliance on rubber or fluid-containing structures. While the apparatus and methods of the subject disclosure have been shown and described with reference to preferred embodiments, those skilled in the art will readily appreciate that changes and/or modifications may be made thereto without departing from the scope of the subject disclosure.

What is claimed is:
1. A suspension arrangement, comprising:
a suspension limiter comprising:
a diaphragm element configured to be placed in operable communication with a suspension such that a rate of increase in load per unit travel of compression of the suspension is reduced near a full travel of the suspension than would exist for the suspension if the diaphragm element were not present, wherein the diaphragm element is configured to deform only elastically through the full travel of the suspension, wherein the diaphragm element includes a diaphragm disc arranged along a compression axis, the diaphragm disc having:
a radially inner hub portion;
a radially outer rim portion;
a diaphragm portion extending between the hub portion and the rim portion; and
a puck fixed relative to the hub portion or the rim portion of the diaphragm disc, wherein the puck is configured to oppose compression of a suspension system spring by deforming the diaphragm portion of the diaphragm disc;
a spring movable between along the compression axis between a loaded position and an unloaded position, wherein the spring is spaced apart from the puck in the unloaded position, wherein the spring abuts the puck in the loaded position;
a piston connected between the puck and the diaphragm disc, wherein the piston is stacked along the translation axis between the puck and the diaphragm disc;
a fastener seated in the piston and coupling the puck to the piston;
a spacer connected between the puck and the diaphragm disc;
a housing with a mounting bracket fixed to the end cap and extending about the diaphragm disc; and
an end cap stacked along the translation axis on a side of the diaphragm disc opposite the puck, wherein the spacer is captive in the end cap and stacked axially along the translation axis between the diaphragm disc and the puck.

2. The suspension arrangement as recited in claim 1, wherein the puck is fixed relative to at least one of the rim and/or the hub portion of the diaphragm disc.

3. The suspension arrangement as recited in claim 1, wherein the diaphragm disc is an end diaphragm disc and further comprising at least one diaphragm disc pair stacked with the end diaphragm disc and the puck along the compression axis.

4. The suspension arrangement as recited in claim 3, wherein the diaphragm disc pair is stacked between the end diaphragm disc and the puck.

5. The suspension arrangement as recited in claim 3, wherein the end diaphragm disc is stacked between the puck and the diaphragm disc pair.

6. The suspension arrangement as recited in claim 1, further comprising a piston connected between the puck and the diaphragm disc.

7. The suspension arrangement as recited in claim 6, wherein the piston is stacked along the translation axis between the puck and the diaphragm disc.

8. The suspension arrangement as recited in claim 6, further comprising a fastener seated in the piston and coupling the puck to the piston.

9. The suspension arrangement as recited in claim 1, further comprising a spacer connected between the puck and the diaphragm disc.

10. The suspension arrangement as recited in claim 1, further comprising an end cap stacked along the translation axis on a side of the diaphragm disc opposite the puck.

11. The suspension arrangement as recited in claim 10, further comprising a housing including a mounting bracket fixed to the end cap and extending about the diaphragm disc.

12. The suspension arrangement as recited in claim 10, further comprising a spacer captive in the end cap and axially stacked along the translation axis between the diaphragm disc and the puck.

13. The suspension arrangement as recited in claim 1, wherein the diaphragm disc is a first end diaphragm disc and further comprising a second diaphragm disc stacked on a side of the first diaphragm disc opposite the puck, and at least one diaphragm disc pair stacked along the compression axis between the first end diaphragm disc and the second end diaphragm disc.

14. The suspension arrangement as recited in claim 1, wherein the spring includes a coil body arranged along the compression axis or a leaf body intersecting the compression axis.

15. A method of loading a suspension arrangement, comprising:
exerting a compressive force against a suspension limiter; and
deforming the suspension limiter elastically such that a rate of increase in load per unit travel of compression of the suspension is reduced near a full travel of the suspension than would exist for the suspension if the diaphragm element were not present, wherein the diaphragm element is configured to deform only elastically through the full travel of the suspension,
wherein the suspension limiter comprises:
a diaphragm element configured to be placed in operable communication with a suspension such that a rate of increase in load per unit travel of compression of the suspension is reduced near a full travel of the suspension than would exist for the suspension if the diaphragm element were not present, wherein the diaphragm element is configured to deform only elastically through the full travel of the suspension,
wherein the diaphragm element includes a diaphragm disc arranged along a compression axis, the diaphragm disc having:
a radially inner hub portion;
a radially outer rim portion;
a diaphragm portion extending between the hub portion and the rim portion; and
a puck fixed relative to the hub portion or the rim portion of the diaphragm disc, wherein the puck is configured to oppose compression of a suspension system spring by deforming the diaphragm portion of the diaphragm disc;
a spring movable between along the compression axis between a loaded position and an unloaded position, wherein the spring is spaced apart from the puck in the unloaded position, wherein the spring abuts the puck in the loaded position;
a piston connected between the puck and the diaphragm disc, wherein the piston is stacked along the translation axis between the puck and the diaphragm disc;
a fastener seated in the piston and coupling the puck to the piston;
a spacer connected between the puck and the diaphragm disc;
a housing with a mounting bracket fixed to the end cap and extending about the diaphragm disc; and
an end cap stacked along the translation axis on a side of the diaphragm disc opposite the puck, wherein the spacer is captive in the end cap and stacked axially along the translation axis between the diaphragm disc and the puck.

16. The method as recited in claim 15, further comprising tuning deformation of the suspension limiter by adding one or more diaphragm discs to the suspension limiter and/or increasing axial thickness of a spacer seated within the suspension limiter.

\* \* \* \* \*